(12) United States Patent
Aufranc et al.

(10) Patent No.: US 8,031,271 B2
(45) Date of Patent: Oct. 4, 2011

(54) CALIBRATING A PROJECTION SYSTEM

(75) Inventors: Richard Aufranc, Corvallis, OR (US); Olan C. Way, Corvallis, OR (US); Bruce Stephens, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1127 days.

(21) Appl. No.: 11/824,852

(22) Filed: Jul. 2, 2007

(65) Prior Publication Data

US 2009/0009658 A1 Jan. 8, 2009

(51) Int. Cl.
*H04N 9/31* (2006.01)
*H04N 9/28* (2006.01)

(52) U.S. Cl. ......... 348/745; 348/744; 348/746; 348/806

(58) Field of Classification Search .................. 348/744, 348/745, 746, 806, 807, 383, 190, 191, 180; 315/370

See application file for complete search history.

(56) References Cited

U.S. PATENT DOCUMENTS

| | | | |
|---|---|---|---|
| 7,038,727 B2 * | 5/2006 | Majumder et al. | 348/383 |
| 2008/0100805 A1 * | 5/2008 | Majumder et al. | 353/30 |

* cited by examiner

*Primary Examiner* — M. Lee
*Assistant Examiner* — Jean W Desir (57) ABSTRACT

A method of calibrating a projection system is disclosed. The method includes determining a location of at least one hotspot on a screen within the projection system, initiating a calibration sequence of the projection system and ignoring the at least one hotspot during the calibration sequence of the projection system.

14 Claims, 6 Drawing Sheets

CALIBRATING A PROJECTION SYSTEM

BACKGROUND

Various techniques have been developed for geometrically calibrating the projectors of multi-projector displays. In some geometric calibration approaches, one or more cameras provide feedback data relating to the images that are projected by the different projectors and projector calibration data is computed from the camera feedback data. The images projected by the projectors are geometrically aligned in accordance with the projector calibration data to generate seamless composite images. However, this calibration process can be negatively affected by the occurrences of "hotspots".

Hotspots are bright areas (diffuse versions of the projector's lamp and lens) that are seen by the viewer through the screen. These hotspots move with respect to the viewing angle and are more intense with higher gain screens. Because these hotspots move with respect to the viewing angle, it is possible to account for them at one angle (e.g looking straight at the screen from the front) but not at another angle (e.g. looking at the screen from the side). Consequently, these hotspots can adversely affect the calibration of the projection system and present a significant problem for the calibration process.

DETAILED DESCRIPTION

As shown in the drawings for purposes of illustration, a method of calibrating a projection system is disclosed. In an embodiment, the method calibrates a projection system whereby hotspots in the projection system are ignored. As previously articulated, hotspots are bright areas that are seen by the viewer through the screen. These hotspots move with respect to the viewing angle and are more intense with higher gain screens. By ignoring hotspots during the calibration sequence, a uniformly blended projection solution is created at any viewing angle.

Figure 1:
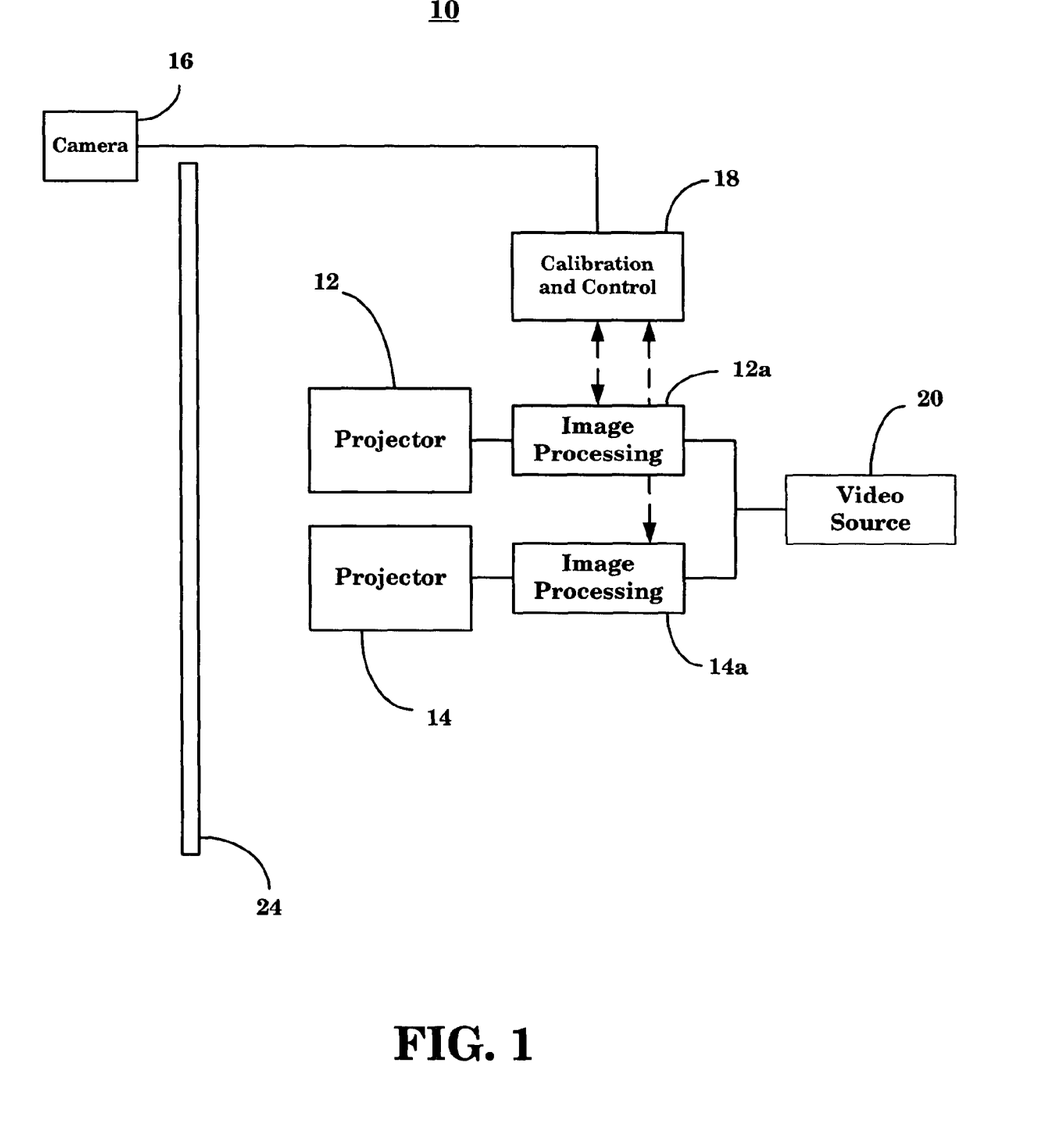
FIG. 1 is a high-level illustration of a multi-projector system in accordance with an embodiment.

FIG. 1 shows a multi-projector system 10 in accordance with an embodiment. The multi-projector system 10 includes projectors 12, 14, along with associated image processing components 12a, 14a, a calibration camera 16, a calibration control component 18 and a video source 20. In operation, the projectors 12, 14 project images onto a projection screen 24 and the camera 16 captures images reflected from the screen 24. In an embodiment, the screen 24 is a rear projection screen, however, any type of projection screen could be employed.

The projectors 12, 14 may be implemented by a wide variety of different light sources. Exemplary light sources include strongly colored incandescent light projectors with vertical slit filters, laser beam apparatus with spinning mirrors, and computer-controlled light projectors (e.g., LCD-based projectors or DLP-based projectors). In the illustrated embodiments, the light projectors 12, 14 could be computer-controlled light projectors that allow the projected light patterns to be dynamically altered via software control components.

In general, the camera 16 may be any type of imaging device, including a computer-controllable digital camera (e.g., a Kodak DCS760 camera), a USB video camera, and a Firewire/1394 camera. USB video cameras or "webcams," such as the Intel PC Pro, generally capture images 30 fps (frames per second) at 320×240 resolution, while Firewire cameras (e.g., Point Grey Research Dragonfly) can capture at higher frame rates and/or resolutions. The camera 16 typically remains fixed in place and is oriented toward the screen 24.

In embodiment, the video source 20 could be an independent unit such as a Digital Versatile Disk (DVD) player, a television tuner, or the like. Alternatively, the video source 20 could be an output from a generic personal computer as well. In either case, the video source 20 transmits video data to the respective projectors 12, 14 via the associated image processing components 12a, 14a.

Figure 2:
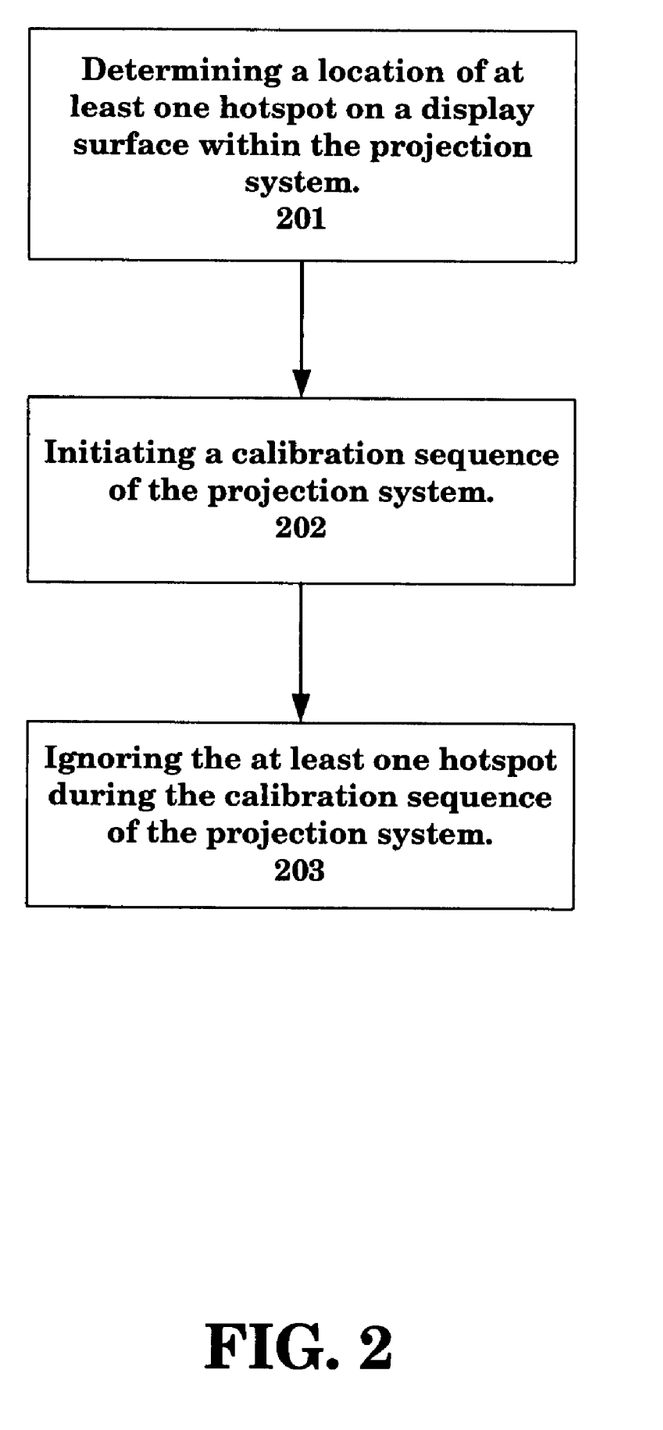
FIG. 2 is a flowchart of a method in accordance with an embodiment.

The calibration control component 18 coordinates the calibration of the projectors 12, 14 in conjunction with the camera 16. Accordingly, in an embodiment, a calibration method is implemented via the calibration control component 18, the projectors 12, 14 and the camera 16. FIG. 2 is a flowchart of a calibration method in accordance with an embodiment. A first step 201 involves determining a location of at least one hotspot on a display surface within the projection system. A second step 202 involves initiating a calibration sequence of the projection system. A final step 203 involves ignoring the at least one hotspot during the calibration sequence of the projection system.

Figure 3:
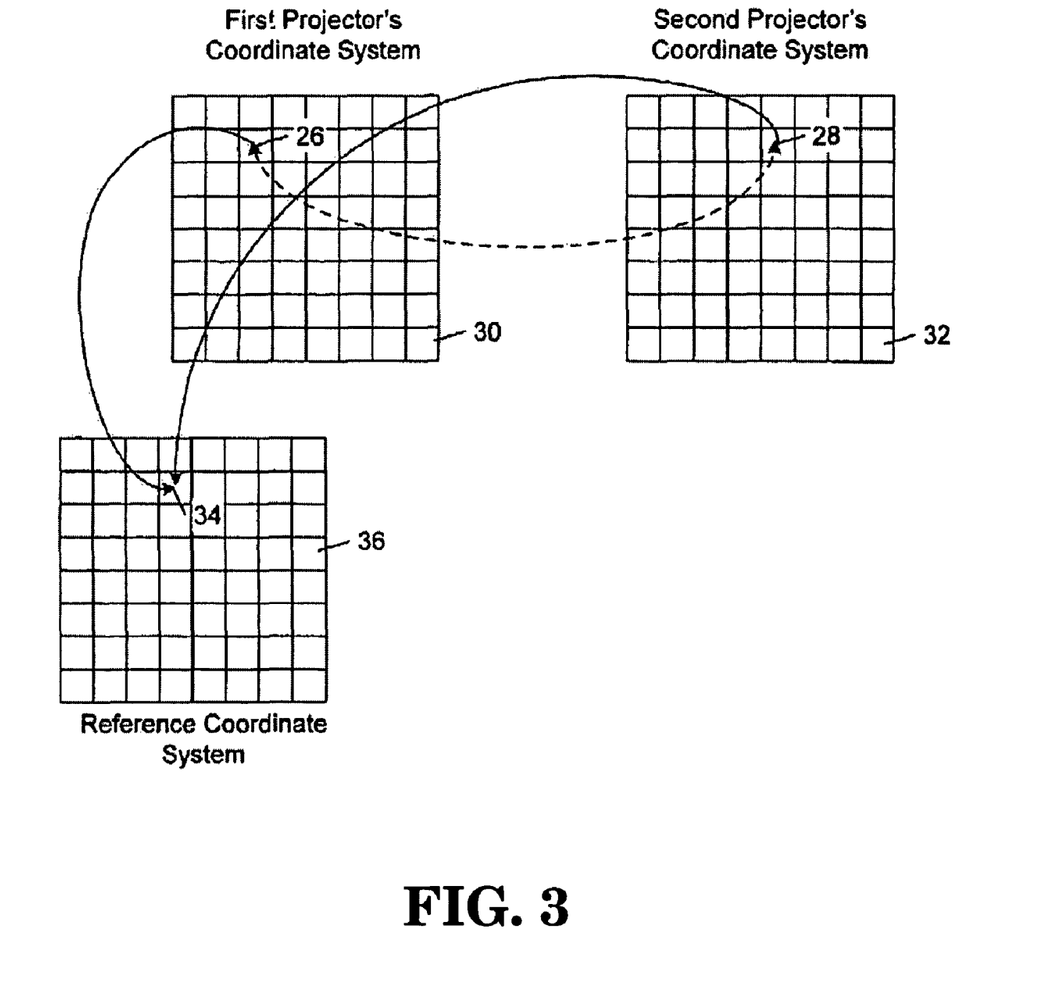
FIG. 3 shows coordinate systems in accordance with an embodiment.

During a geometric calibration phase of operation of the system, image data from which a correspondence mapping of the projection planes of the projectors 12, 14 with respect to a common reference coordinate system is generated. For example, as shown in FIG. 3, in some implementations, the calibration control component 18 maps pixels 26, 28 in coordinate systems 30, 32 in the projection planes of each of the projectors 12, 14 to a corresponding region 34 in a reference coordinate system 36. In general, each coordinate system 30, 32, 36 is defined by a rectangular grid with w×h connected rectangular regions, where w and h are width and height dimensions of the grid. Based on these correspondences, the calibration control component 18 determines the direct correspondences between the coordinate systems 30, 32 of the projectors 12, 14.

In an embodiment, the camera 16 is positioned to the side of the display 24 whereby the hotspots aren't visible. Because the image data received from the camera 16 is doesn't include image data related to hotspots, the calibration control component 18 can therefore geometrically calibrate the projectors 12, 14 by taking into account luminance differences on the screen 24 while ignoring any hotspots. The geometric calibration is then applied to the projectors 12, 14 via the respective image processing components of the projectors 12, 14.

Although the calibration control component and the image processing component are shown as separate control components, these components could be merged into a single processing block and implemented via a single computing platform (e.g. a personal computer). Furthermore, the image processing component could be implemented via a separate computer or hardware solution (e.g. ASIC, FPGA).

Additionally, although the above-delineated sequence is described as being mapped in the context of pixels, one of ordinary skill in the art will readily recognize that any area could be employed while remaining within the spirit and scope of the inventive concept.

Furthermore, although the above-described embodiment includes a single camera 16, the multi-projector system 10 may include more than one camera for providing feedback to the calibration control component 18 and calibrating the projection system. In these embodiments, multiple cameras capture respective sets of projected light patterns.

Figure 4:
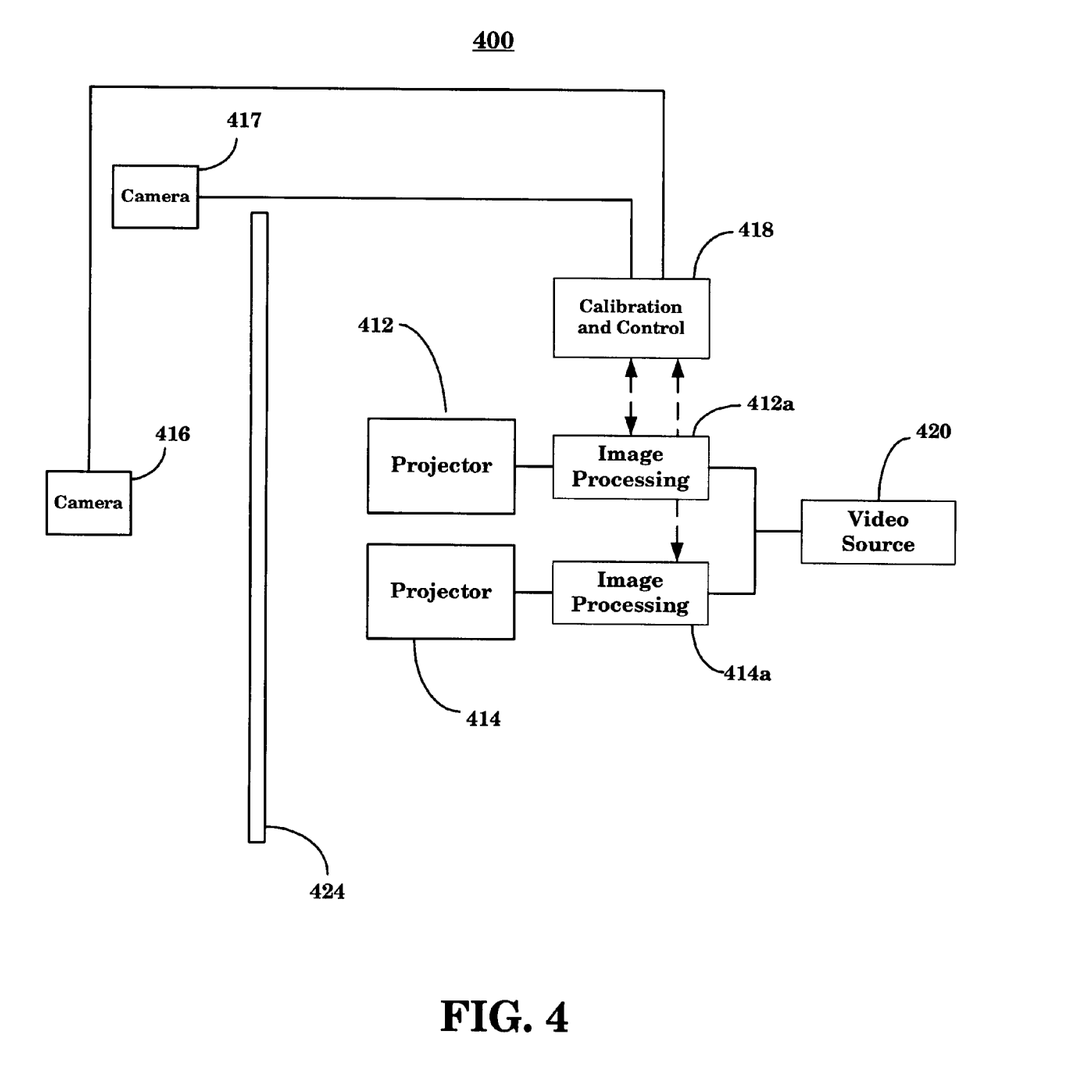
FIG. 4 shows a multi-projector system in accordance with an alternate embodiment.

FIG. 4 shows a multi-projector system 400 in accordance with an alternate embodiment. The multi-projector system 400 includes projectors 412, 414, along with associated image processing components 412a, 414a, a first camera 416, a second camera 417, a calibration control component 418, a video source 420 and a projection screen 424. The calibration control component 518 that controls the calibration of the projectors 412, 414. Accordingly, in the multi-camera embodiment step 201 is implemented via the first and second cameras 416, 417. In this embodiment, the first camera 416 represents a main calibration camera that is centered and orthogonal to the screen 424 and the second camera 417 is a secondary calibration camera positioned on the side of the screen 424 where no hotspots are seen.

Accordingly, the calibration control component 418 receives image data from the first camera 416 and the second camera 417 and geometrically translates this data to a common coordinate space. The image data from the first camera 416 includes image data related to the hotspots whereas the image data from the second camera 417 doesn't include data related to hotspots since they are not seen by the second camera 417. The image data from the second camera 417 is then subtracted from the image data of the first camera 416 thereby identifying the image data related to any hotspots. Consequently, by identifying the image data related to the hotspots, this image data can be ignored during the subsequent geometric calibration of the multi-projection system 400.

Figure 5:
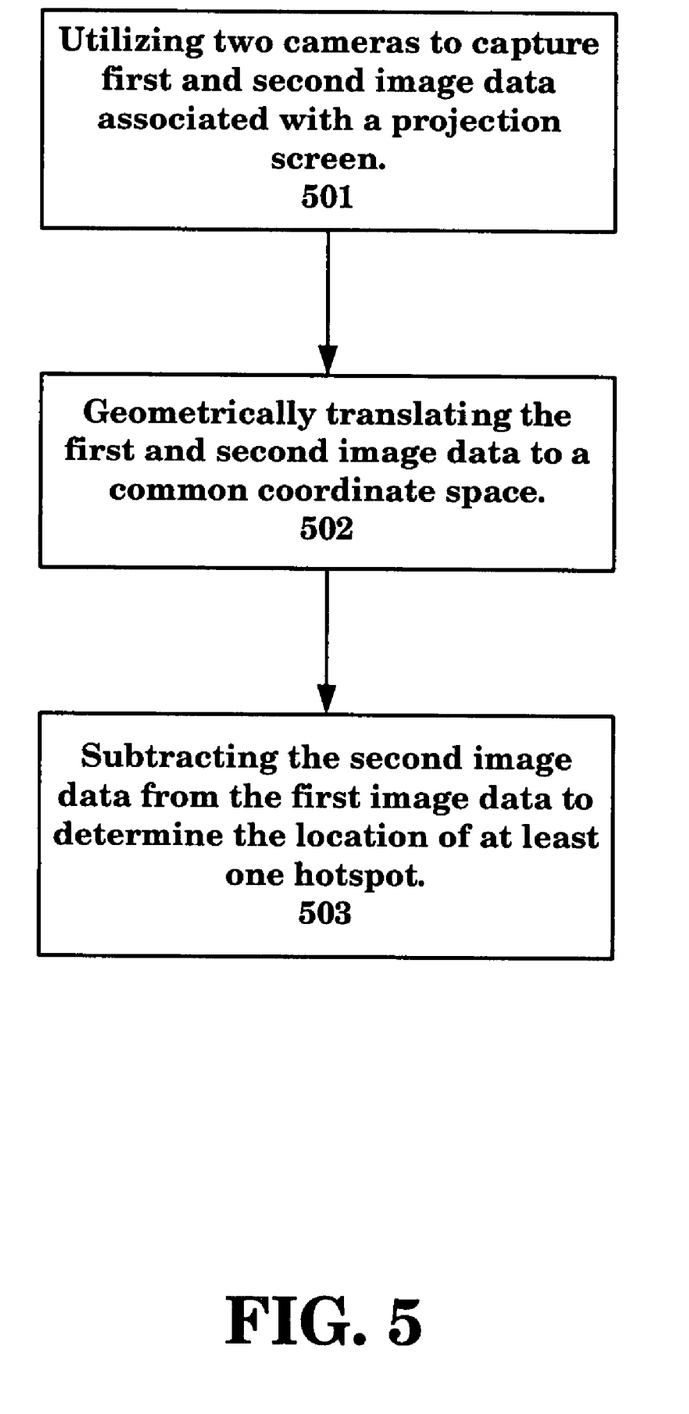
FIG. 5 is a flowchart of a method in accordance with an alternate embodiment.

FIG. 5 is a flowchart of a method in accordance with the above described-embodiment. A first step 501 involves utilizing two cameras to capture first and second image data associated with a projection screen. A second step 502 involves geometrically translating the first and second image data to a common coordinate space. A final step 503 involves subtracting the second image data from the first image data to determine the location of at least one hotspot.

An alternate multiple camera embodiment, is similar to the above-described embodiment but includes luminance value measurements. Accordingly, the calibration control component 418 receives image data from the first camera 416 and the second camera 417 and geometrically translates this data to a common coordinate space. The image data from the first camera 416 includes image data related to the hotspots whereas the image data from the second camera 417 doesn't include data related to hotspots since they are not seen by the second camera 417. Normalized luminance values are then determined based on the image data received from the first and second cameras 416, 417 respectively. Next, the images are compared pixel by pixel and at each pixel the minimum luminance value is utilized to form a calibration image. Consequently, the bright hotpots (i.e. higher luminance values) that move with respect to the viewer are ignored. The subsequent geometric calibration of the multi-projection system 400 is then performed utilizing the hotspot-free calibration image.

Figure 6:
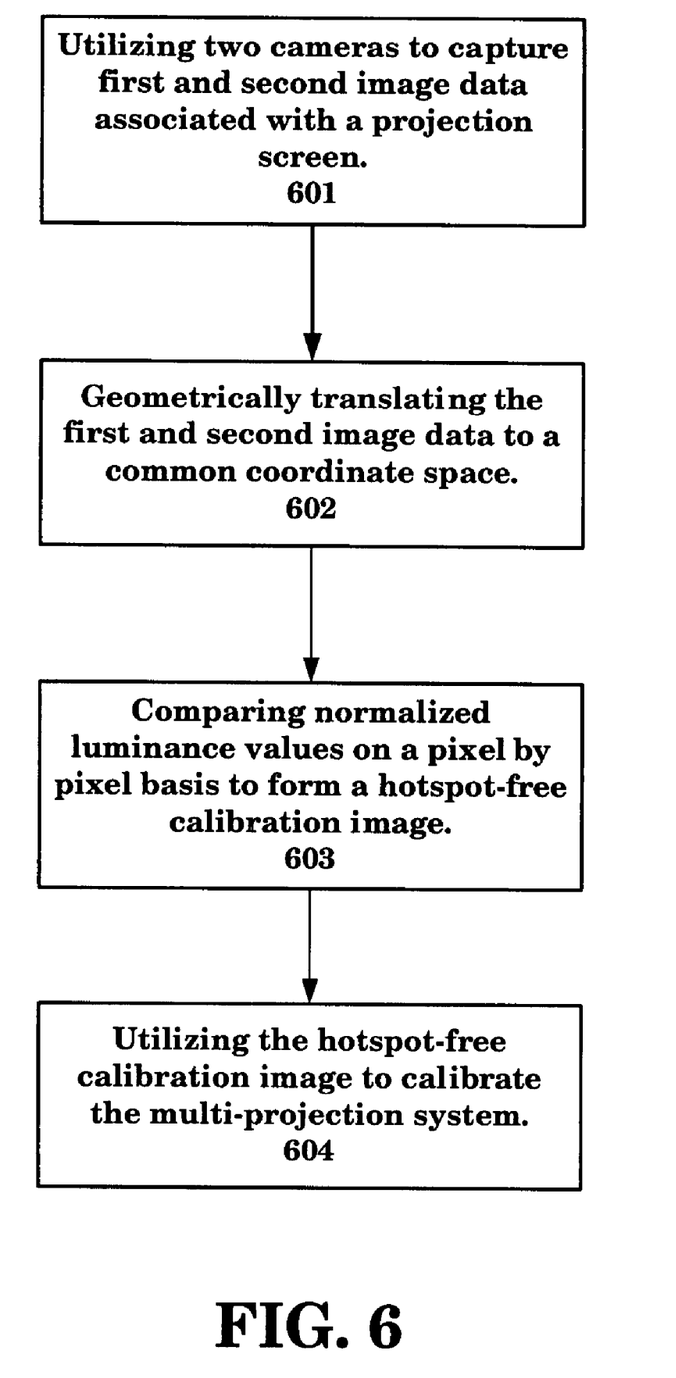
FIG. 6 is a flowchart of a method in accordance with another embodiment.

FIG. 6 is a flowchart of a method in accordance with the above-described embodiment. A first step 601 involves utilizing two cameras to capture first and second image data associated with a projection screen. A second step 602 involves geometrically translating the first and second image data to a common coordinate space. A next step 603 involves comparing normalized luminance values on a pixel by pixel basis to form a hotspot-free calibration image. A final step 604 includes utilizing the hotspot-free calibration image to calibrate the multi-projection system.

It should be noted that although the above described embodiments are disclosed in the context of employing two cameras, one of ordinary skill in the art will readily recognize that any number of cameras could be utilized while remaining within the spirit and scope of the inventive concepts.

A method of calibrating a projection system is disclosed. The method includes determining a location of at least one hotspot on a screen within the projection system, initiating a calibration sequence of the projection system and ignoring the at least one hotspot during the calibration sequence of the projection system.

The above-described embodiment may also be implemented, for example, by operating a computer system to execute a sequence of computer readable instructions. Accordingly, a computing device typically includes at least some form of computer readable media. Computer readable media can be any available media that can be accessed by computing device. By way of example, and not limitation, computer readable media may comprise computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by a computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for calibrating a projection system.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A method of calibrating a projection system comprising:
   determining a location of at least one hotspot on a projection screen within the projection system comprising at least two calibration cameras including:
      capturing a first image of the projection screen with one of the at least two cameras;
      capturing a second image on the projection screen with another of the at least two camera;
      translating the captured first and second image geometrically to a common coordinate space; and
      subtracting the translated second image from the translated first image to determine the location of the at least one hotspot;
   initiating a calibration sequence of the projection system; and
   ignoring the at least one hotspot during the calibration sequence of the projection system.

2. The method of claim 1 wherein determining a location of the at least one hotspot further comprises:
   capturing an image of the screen with a calibration camera wherein the calibration camera is positioned in manner in which the at least one hotspot cannot be seen; and
   translating the captured image geometrically to a common coordinate space.

3. The method of claim 1 wherein determining a location of the at least one hotspot further comprises:
   capturing a first image of the projection screen with one of the at least two cameras;
   capturing a second image on the projection screen with another of the at least two camera;
   mapping the captured first and second image geometrically to a common coordinate space;
   comparing the captured first and second image; and
   normalizing an average luminosity between the captured first and second image.

4. The method of claim 3 wherein ignoring the at least one hotspot further comprises:
   using a minimum luminosity during the calibration sequence.

5. The method of claim 3 wherein mapping the captured first and second image geometrically to a common coordinate space further comprises mapping pixels associated with the captured first and second image and comparing the captured first and second image further comprises comparing the captured first and second image pixel by pixel.

6. A computer program product for calibrating a projection system, the computer program product comprising a non-transitory computer usable medium having computer readable program for causing a computer to perform the steps of:
   determining a location of at least one hotspot on a projection screen within the projection system including at least two calibration cameras and further including:
      capturing a first image of the projection screen with one of the at least two cameras;
      capturing a second image on the projection screen with another of the at least two cameras;
      translating the captured first and second image geometrically to a common coordinate space; and
      subtracting the translated second image from the translated first image to determine the location of the at least one hotspot;
   initiating a calibration sequence of the projection system; and
   ignoring the at least one hotspot during the calibration sequence of the projection system.

7. The computer program product of claim 6 wherein determining a location of the at least one hotspot further comprises:
   capturing an image of the screen with a calibration camera wherein the calibration camera is positioned in manner in which the at least one hotspot cannot be seen; and
   translating the captured image geometrically to a common coordinate space.

8. The computer program product of claim 6 wherein determining a location of the at least one hotspot further comprises:
   capturing a first image of the projection screen with one of the at least two cameras;
   capturing a second image on the projection screen with another of the at least two camera;
   mapping the captured first and second image geometrically to a common coordinate space;
   comparing the captured first and second image; and
   normalizing an average luminosity between the captured first and second image.

9. The computer program product of claim 8 wherein ignoring the at least one hotspot further comprises:
   using a minimum luminosity during the calibration sequence.

10. The computer program product of claim 8 wherein mapping the captured first and second image geometrically to a common coordinate space further comprises mapping pixels associated with the captured first and second image and comparing the captured first and second image further comprises comparing the captured first and second image pixel by pixel.

11. A projection system comprising:
   at least two projectors each of the at least two projectors having an image processing component associated therewith;
   a projection screen for displaying images from the at least two projectors;
   at least two calibration cameras; and
   a calibration control component coupled to the at least one calibration camera and each of the image processing components wherein the calibration component is configured to perform a method of calibrating the projection system comprising the steps of determining a location of at least one hotspot on the projection screen including:
      capturing a first image of the screen with one of the at least two calibration cameras; capturing a second image on the projection screen with another of the at least two calibration cameras;
      translating the captured first and second image geometrically to a common coordinate space; and
      subtracting the translated second image from the translated first image to determine the location of the at least one hotspot;
   initiating a calibration sequence of the projection system; and
   ignoring the at least one hotspot during the calibration sequence of the projection system.

12. The system of claim 11 wherein determining a location of the at least one hotspot further comprises:
   capturing an image of the projection screen with the at least one calibration camera wherein the at least one calibration camera is positioned in manner in which the at least one hotspot cannot be seen; and
   translating the captured image geometrically to a common coordinate space.

13. The system of claim 11 wherein determining a location of the at least one hotspot further comprises:
- capturing a first image of the projection screen with one of the at least two cameras;
- capturing a second image on the projection screen with another of the at least two camera;
- mapping the captured first and second image geometrically to a common coordinate space;
- comparing the captured first and second image; and
- normalizing an average luminosity between the captured first and second image.

14. The system of claim 13 wherein ignoring the at least one hotspot further comprises:
- using a minimum luminosity during the calibration sequence.

* * * * *